United States Patent [19] [11] 4,107,495
Hawley et al. [45] Aug. 15, 1978

[54] ELECTRONIC TONE RINGER

[75] Inventors: George Thomas Hawley, Murray Hill; Lawrence Henry Young, Hanover Township, Morris County, both of N.J.

[73] Assignee: Bell Telephone Laboratories, Incorporated, Murray Hill, N.J.

[21] Appl. No.: 795,946

[22] Filed: May 11, 1977

[51] Int. Cl.² .............................................. H04M 1/26
[52] U.S. Cl. .................................................... 179/84 T
[58] Field of Search .............. 179/84 R, 84 T, 84 VF, 179/2 A, 2 AM, 5 R, 1 MN

[56] References Cited
U.S. PATENT DOCUMENTS

| 3,072,894 | 1/1963 | Chapin | 179/2 AM |
| 3,508,012 | 4/1970 | Golembeski | 179/84 T |
| 3,808,379 | 4/1974 | Lind | 179/84 T |

Primary Examiner—Kathleen H. Claffy
Assistant Examiner—Joseph A. Popek
Attorney, Agent, or Firm—Henry T. Brendzel; Joseph P. Kearns

[57] ABSTRACT

Disclosed is an apparatus for telephone signaling comprising a burst detector connected across the line emanating from the central office and an amplifier, similarly connected, which is enabled with the output signal of the burst detector. In operation, the central office applies a succession of signal bursts of predetermined frequency and duration, followed by the desired alerting signal. When a signal burst is detected in the burst detector, the amplifier is enabled for a predetermined period of time following the signal burst. During the enabled time, the ringing signal applied by the central office is appropriately amplified to cause an alerting transducer to produce the desired sound.

11 Claims, 3 Drawing Figures

ELECTRONIC TONE RINGER

BACKGROUND OF THE INVENTION

This invention relates to tone ringers and, more particularly, to tone ringers adaptable for use in telephone or intercom systems.

DESCRIPTION OF THE PRIOR ART

The use of an electromechanical bell ringer as the primary signaling device for telephone subscribers is virtually as old as the telephone itself. Despite the fact that bell ringers are effective, relatively simple to manufacture and seemingly modest in price when the overall cost of a telephone set is considered, recent advances in the telephone art and in the field of electronics in general raise questions as to whether conventional telephone ringing systems may not be outmoded. It is not surprising, therefore, that various attempts have been made in the art to develop electronic tone ringers.

One of the more versatile tone ringer designs is disclosed by J. J. Golembeski et al U.S. Pat. No. 3,508,012, issued Apr. 21, 1970, where the ringer employs an oscillator-active filter circuit. When conventional bell ringing signals are applied, internal circuitry detects the high voltages and causes the filter's gain to increase. The increased loop gain causes the filter to act as an oscillator, developing thereby the desired tone ringing signals which are applied to an alerting transducer. When tone ringing low-level signals matched to the filter's frequency are applied, the network acts as an active filter which permits an amplified replica of the applied ringing signals to be passed to the alerting transducer. In this mode, the filter-oscillator circuit acts as a selector, or detector, of the correct frequency.

A similar system is described by P. U. Lind in U.S. Pat. No. 3,808,379, issued Apr. 30, 1974. Therein, the tone ringer employs a detector which is operatively responsive to both conventional ringing signals and to tone ringing signals. A dc signal is generated by the detector is response to applied ringing signals and the developed dc signal serves as the power source for an oscillator which develops the desired ringing signal.

Although the above systems are responsive to both conventional and certain low-level ringing signals, little flexibility is provided with respect to the waveform, or spectrum, of the ringing signals employed. In the Golembeski circuit, the filter is tuned to a predetermined frequency. In Lind's circuit, the internal oscillator develops a predetermined fixed signal.

It is an object of this invention, therefore, to develop a flexible electronic ringer.

It is another object of this invention to develop a simple electronic ringer capable of accepting a diverse plurality of alerting signals from the telephone central office.

It is a further object of this invention to develop an electronic tone ringer adaptable to a plurality of extensions.

It is a still further object of this invention to develop an electronic tone ringer capable of effectively interacting with the central office and the subscriber or other source of telephone alerting signals.

SUMMARY OF THE INVENTION

These and other objects are achieved, in accordance with the principles of this invention, by placing a burst detector across the telephone line emanating from the central office and by enabling a transponder including an amplifier with the output signal of the burst detector. The amplifier's input terminals are connected across the central office line and its output signal is applied to an alerting transducer.

In operation, the central office applies a succession of signal bursts of predetermined frequency and duration, followed by the desired ringing signal. When a signal burst is detected in the burst detector, the amplifier is enabled for a predetermined period of time following the signal burst, and during the enabled time, the ringing signal applied by the central office is appropriately amplified to cause the alerting transducer to produce the desired sound. Since the means for producing the sounds is the combination of an amplifier and an electronic transducer, the alerting sound may be any tone, combination of tones or even a speech message.

DETAILED DESCRIPTION

Figure 1:
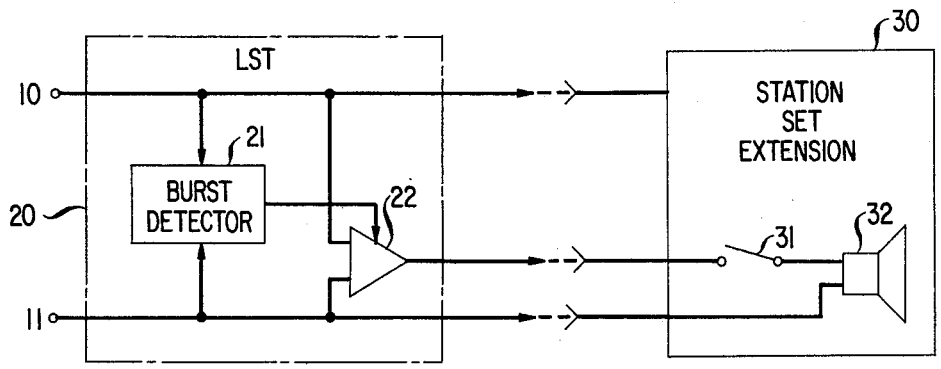
FIG. 1 illustrates a general block diagram of an elementary system employing the principles of this invention.

The installation of FIG. 1, which depicts an elementary station set installation employing the principles of this invention, includes a telephone line emanating from the central office (depicted in FIG. 1 by terminals 10 and 11), a Loop Signaling Transceiver (LST) 20 connected across the line for amplifying ringing signals applied by the central office, and a plurality of telephone station set extensions. Only a single extension 30 is shown in FIG. 1, but it is understood that many extensions may be connected in parallel.

In Loop Signaling Transceiver 20, a burst detector 21 and an amplifier 22 are connected across terminals 10 and 11. The output signal of burst detector 21 is applied to amplifier 22 and the output terminal of amplifier 22 develops the desired tone ringing signal. As the name implies, burst detector 21 detects signal bursts of predetermined frequency and duration which appear across the central office line. Those signal bursts may conveniently be in the audio range and possess an amplitude comparable to that of normal station set 30 talking conditions. When such signal bursts are detected, amplifier 22 is enabled by burst detector 21 for specified periods of time following the occurrence of each detected burst. Consequently, alerting signals appearing across terminals 10 and 11 during the enabled periods appear amplified at the output of amplifier 22.

In station set extension 30 (and in all other extensions where ringing is desired) there is a transducer 32 which is connected to off-hook switch 31 of the extension. The serial connection of transducer 32 and switch 31 is coupled to the output terminal of amplifier 22. Thus, when amplifier 22 is enabled and alerting signals are transmitted by the central office, or other alerting source, the amplified alerting signals are converted to sound in transducer 32. When station set 30 goes "off-hook" either in response to the alerting signals or otherwise, switch 31 opens and disconnects the alerting sound from transducer 32.

Figure 2:
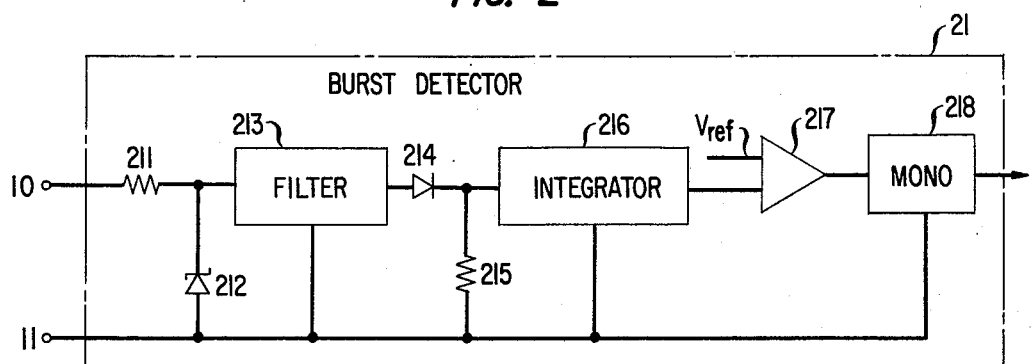
FIG. 2 illustrates one embodiment for burst detector 21 of FIG. 1.

FIG. 2 illustrates one embodiment for burst detector 21. Therein, resistor 211 and zener diode 212 are connected across terminals 10 and 11 to limit the excursions of signals appearing across the line, and the signals across zener diode 212 are applied to narrow band filter 213, which may be of any conventional "notch filter" design. An interesting design for filter 213 which employs ccd technology is described, for example, in U.S. Pat. No. 3,971,998, issued to Gopinath et al on July 27, 1976.

Filter 213 produces a sine wave output whenever the frequency to which the filter is tuned is present at the input terminals. Because of the limiting action of diode 212, the magnitude of that since wave is predetermined, and a determination as to the presence of a burst on the line can be made exclusively on the basis of power. Thus, the output signal of filter 213 is rectified by the combination of diode 214 and resistor 215, and the rectified signal appearing across resistor 215 is applied to integrator 216. The output signal of integrator 216 is generally triangular, has a positive slope during the detected occurrence of a burst signal, and a negative slope reaching smoe limit base potential, at all other times. The output signal of integrator 216 is applied to voltage comparator 217 which compares the triangular waveform of integrator 216 to a fixed voltage reference preselectively higher than the above mentioned limit base potential. That comparison results in a train of pulses whenever a train of bursts is transmitted over the telephone line. The train of pulses developed by comparator 217 is applied to monostable multivibrator 218, developing thereby another train of pulses. The pulses developed in multivibrator 218 occur after the termination of each burst applied by the central office and have a duration that is strictly controlled by the multivibrator's parameters. The pulses developed by multivibrator 218 comprise the enabling, or gating, signal of burst detector 21 which is applied to amplifier 22.

Amplifier 22 can be of any conventional design and, expectedly, can be one that is commercially available, such as the Texas Instrument, Incorporated, SN52514 differential comparator. Other embodiments for amplifier 22 are, of course, possible. For example, amplifier 22 may be an amplifier without enabling or strobing capability but with some means for gating the input signal or with some means for gating the power source. As long as some controlled gating, connecting or enabling is realized together with some gain, the function of amplifier 22 is achieved.

Figure 3:
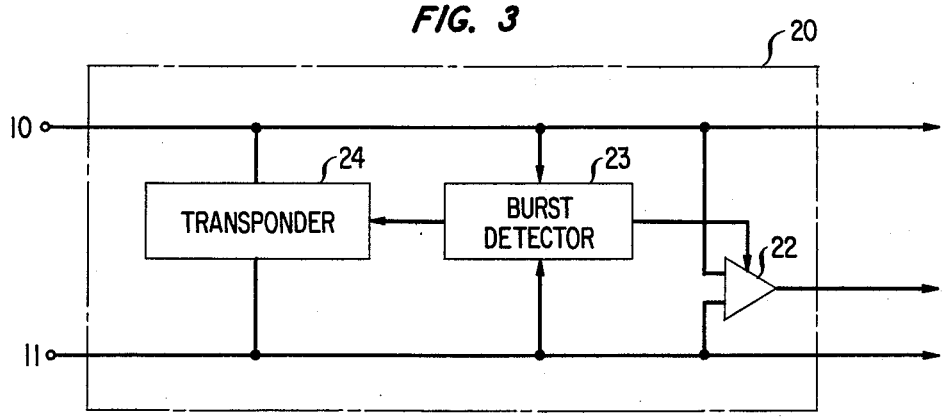
FIG. 3 depicts an alternate block diagram for the Loop Signaling Transceiver of FIG. 1 employing the principles of this invention.

Having a single and separate Loop Signaling Transceiver element in each installation of telephone station set extensions permits a number of very important improvements. One notable improvement is the inclusion of a transponder capable of communication with the central office and/or with the telephone extensions. Such a transponder may be included in Loop Signaling Transceiver 20 and may be made responsive to burst detector 23. The interconnection of such a transponder is shown diagramatically in FIG. 3 where transponder 24 is connected to terminals 10 and 11 and adapted to send and receive information from the central office under direction of control signals from burst detector 23. Burst detector 23 is very similar to burst detector 21. It comprises two or more detection circuits of the type shown in FIG. 2, with one circuit enabling amplifier 22 and the other circuit, or circuits, enabling transponder 24. Transponder 24, expectedly, can be designed to perform any desired function or chore such as meter reading, turning heat on or off, et cetera.

What is claimed is:

1. A telephone station set installation coupled to a central office line providing preconditioning signal bursts of predetermined characteristics preceding ringing signals comprising:
   a normally quiescent amplifier for providing ringing signals appearing across said line to an alerting transducer operative in response to a control signal and
   a burst detector responsive to said preconditioning signal bursts for developing said control signal and applying it to said amplifier for the duration of said ringing signals.

2. A telephone station set installation connected to a line emanating from a central office providing signal bursts of predetermined characteristics preceding ringing signals comprising:
   an amplifier for said ringing signals;
   a burst detector connected across said line for connecting said amplifier across said line in response to said signal bursts; and
   alerting transducer means connected to said amplifier for developing alerting sounds in response to said ringing signals.

3. The apparatus of claim 2 wherein said ringing signals applied by said central office occur after said signal bursts.

4. The apparatus of claim 2 wherein said detector connects said amplifier across said line for predetermined time durations.

5. The apparatus of claim 4 wherein said predetermined time durations follow the termination of said signal bursts.

6. A telephone station set installation having a terminal pair adapted for connection to a telephone line providing ringing signals preceded by preconditioning signal bursts comprising:
   an amplifier for said ringing signals coupled to said terminal pair;
   an alerting transducer driven by said amplifier to produce audible ringing sounds; and
   a burst detector coupled to said terminal pair for enabling said amplifier in response to said preconditioning signal bursts.

7. The apparatus of claim 6 wherein said alerting transducer is a telephone receiving transducer.

8. The apparatus of claim 6 wherein said detector and said amplifier are housed separately from said alerting transducer means.

9. The apparatus of claim 6 wherein said preconditioning signal bursts are of a predetermined frequency.

10. The apparatus of claim 6 wherein said preconditioning signal bursts are of a predetermined duration.

11. The apparatus of claim 6 wherein said preconditioning signal bursts are in the audio range.

* * * * *